(12) United States Patent  (10) Patent No.: US 8,812,816 B2
Post et al.                 (45) Date of Patent:     Aug. 19, 2014

(54) GARBAGE COLLECTION SCHEMES FOR INDEX BLOCK

(75) Inventors: Daniel J. Post, Campbell, CA (US); Vadim Khmelnitsky, Foster City, CA (US)

(73) Assignee: Apple Inc., Cupertino, CA (US)

( * ) Notice: Subject to any disclaimer, the term of this patent is extended or adjusted under 35 U.S.C. 154(b) by 897 days.

(21) Appl. No.: 12/729,556

(22) Filed: Mar. 23, 2010

(65) Prior Publication Data

US 2011/0238886 A1   Sep. 29, 2011

(51) Int. Cl.
G06F 12/00 (2006.01)
G06F 13/00 (2006.01)
G06F 13/28 (2006.01)
G06F 7/00 (2006.01)
G06F 17/00 (2006.01)
G06F 17/30 (2006.01)

(52) U.S. Cl.
USPC ........... 711/202; 711/154; 707/674; 707/679; 707/687; 707/696; 707/813; 707/797

(58) Field of Classification Search
None
See application file for complete search history.

(56) References Cited

U.S. PATENT DOCUMENTS

| | | | |
|---|---|---|---|
| 6,970,890 B1 * | 11/2005 | Bruce et al. ............................. 1/1 |
| 2005/0071336 A1 * | 3/2005 | Najork et al. ..................... 707/8 |
| 2005/0141312 A1 * | 6/2005 | Sinclair et al. ................ 365/222 |
| 2008/0104308 A1 * | 5/2008 | Mo et al. ......................... 711/103 |
| 2008/0282023 A1 * | 11/2008 | Biswas et al. .................. 711/103 |
| 2008/0282024 A1 * | 11/2008 | Biswas et al. .................. 711/103 |
| 2008/0282045 A1 * | 11/2008 | Biswas et al. .................. 711/159 |
| 2011/0022778 A1 * | 1/2011 | Schibilla et al. ............... 711/103 |
| 2011/0022780 A1 | 1/2011 | Wakrat et al. |
| 2011/0022819 A1 | 1/2011 | Post et al. |
| 2011/0055626 A1 * | 3/2011 | Yang et al. .................... 714/6.12 |
| 2012/0304000 A1 * | 11/2012 | Biswas et al. ................. 714/6.11 |

* cited by examiner

*Primary Examiner* — Sanjiv Shah
*Assistant Examiner* — Marwan Ayash
(74) *Attorney, Agent, or Firm* — Van Court & Aldridge LLP

(57) ABSTRACT

Systems and methods are provided for handling uncorrectable errors that may occur during garbage collection of an index page or block in non-volatile memory.

11 Claims, 8 Drawing Sheets

GARBAGE COLLECTION SCHEMES FOR INDEX BLOCK

FIELD OF THE INVENTION

This can relate to systems and methods for handling uncorrectable errors that may occur during garbage collection of an index page or block in non-volatile memory.

BACKGROUND OF THE DISCLOSURE

NAND flash memory, as well as other types of non-volatile memories ("NVMs"), are commonly used in electronic devices for mass storage. For example, consumer electronics such as portable media players often include flash memory to store music, videos, and other media.

Non-volatile memories, however, may develop defective memory cells through everyday use, and operational memory cells may suffer from program/erase/read disturb due to voltages applied to neighboring cells. When a memory location, such as a page, of a NVM contains too many defective cells or otherwise becomes unusable from excessive errors, the information contained within that memory location may be lost. When this occurs, the electronic device using the NVM might lose user data (e.g., data stored by an application) or data that keeps track of the location of pages in the NVM (e.g., pages that store a logical-to-physical mapping). If a page that stores the logical-to-physical mapping experiences an uncorrectable error (e.g., it is lost), the NMV system may not be able to use the data contained therein to translate between a logical address and a physical address. Such pages are referred to herein as index pages.

In some operations such as garbage collection, the occurrence of an uncorrectable error (e.g., an unreadable memory location) in an index page can have substantial adverse effect on the management of the NVM.

SUMMARY OF THE DISCLOSURE

Accordingly, systems and methods are disclosed for handling uncorrectable errors in a non-volatile memory that occur during garbage collection of an index block, the index block containing pages that map logical sectors to physical pages. Index pages that experience an uncorrectable error can be reconstructed using a data structure in volatile memory. In particular, the volatile data structure may contain a tree that holds the physical addresses of the most recently accessed or written logical sectors in a compressed format. Provided the tree contains the logical-to-physical mapping for the index page having the error, that index page can be reconstructed in a new page, thereby enabling the garbage collection of the index block to continue without having to invoke a restore operation.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
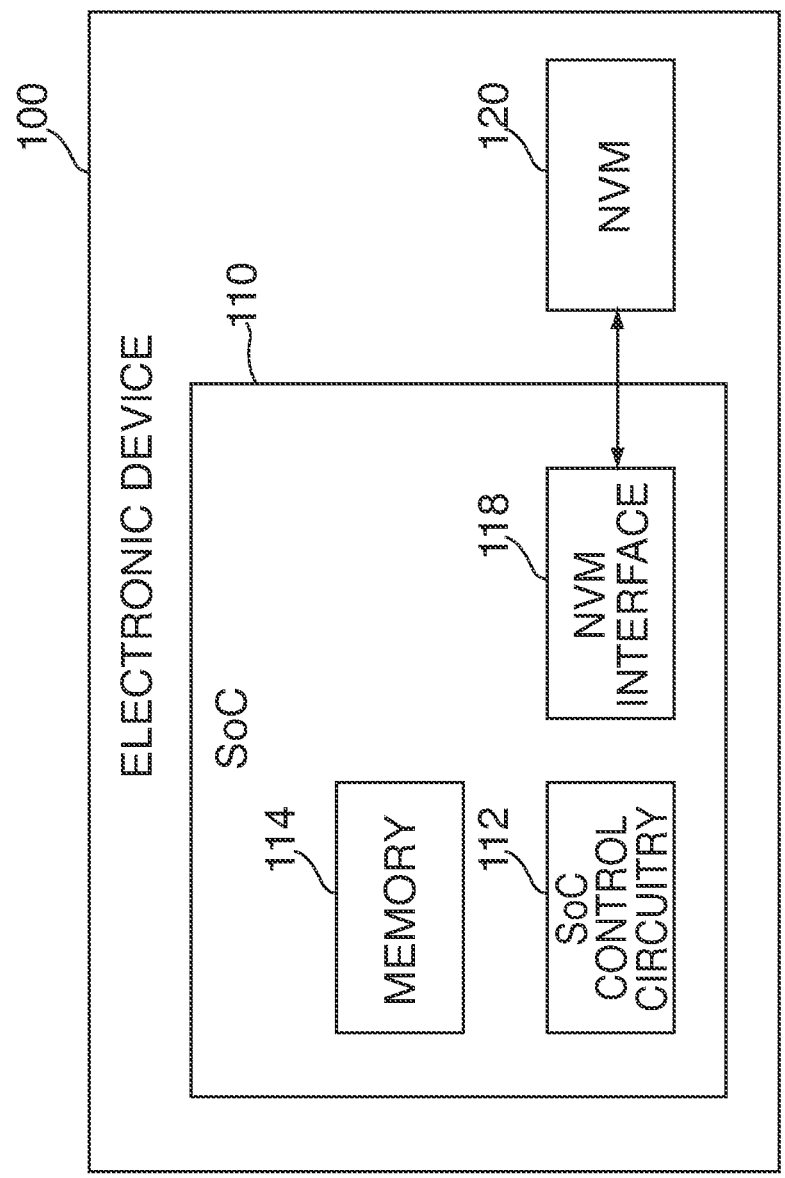
FIGS. 1 and 2 are schematic views of electronic devices configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), any other known or future types of non-volatile memory technology, or any combination thereof. NVM 120 can be organized into "blocks" that may each be erasable at once, and further organized into "pages" that may each be programmable and readable at once. In some embodiments, NVM 120 can include multiple integrated circuits, where each integrated circuit may have multiple blocks. The blocks from corresponding integrated circuits (e.g., blocks having the same position or block number) may form "super blocks." Each memory location (e.g., page or block) of NVM 120 can be addressed using a physical address (e.g., a physical page address or physical block address).

FIG. 1, as well as later figures and various disclosed embodiments, may sometimes be described in terms of using flash technology. However, this is not intended to be limiting, and any other type of non-volatile memory can be implemented instead. Electronic device 100 can include other components, such as a power supply or any user input or output components, which are not depicted in FIG. 1 to prevent overcomplicating the figure.

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write commands from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, a processor implemented as part of SoC control circuitry 112 may execute a software-based memory driver for NVM interface 118. Accordingly, portions of SoC control circuitry 112 and NVM interface 118 may sometimes be referred to collectively as "control circuitry."

FIG. 1 illustrates an electronic device where NVM 120 may not have its own controller. In other embodiments, electronic device 100 can include a target device, such as a flash or SD card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2:
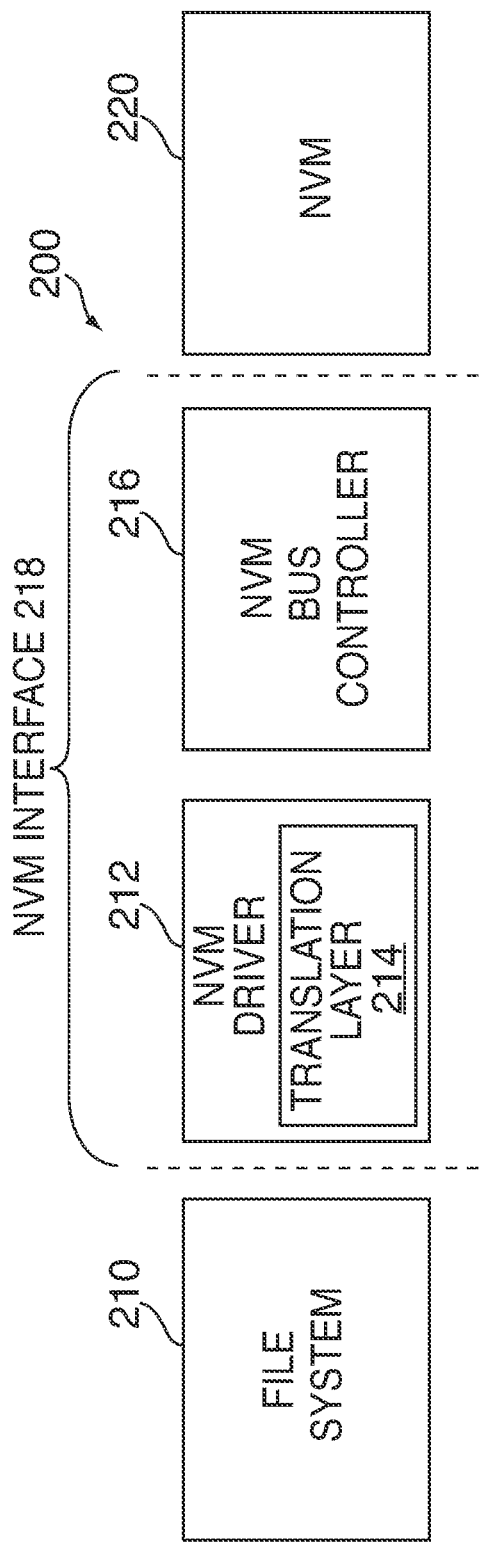

FIG. 2 is a schematic view of electronic device 200, which may illustrate in greater detail some of the firmware, software and/or hardware components of electronic device 100 (FIG. 1) in accordance with various embodiments. Electronic device 200 may have any of the features and functionalities described above in connection with FIG. 1, and vice versa. Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system and may be part of the operating system of electronic device 200 (e.g., part of SoC control circuitry 112 of FIG. 1). In some embodiments, file system 210 may include a flash file system, which provides a logical to physical mapping of pages. File system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write operation, translation layer 214 can map the provided logical address to a free, erased physical location on NVM 220. On a read operation, translation layer 214 can use the provided logical address to determine the physical address at which the requested data is stored. Because each NVM may have a different layout depending on the size or vendor of the NVM, this mapping operation may be memory and/or vendor specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access requests (e.g., program, read, and erase requests). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata." The metadata may be generated by NVM driver 212 or may be generated by a module operating under the control of NVM driver 212. For example, metadata can include any information used for managing the mapping between logical and physical addresses, bad block management, wear leveling, error correcting code ("ECC") data, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location. For example, the metadata may contain a flag that indicates whether the stored data is good data.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. For example, in embodiments where NVM interface 218 maps logical sectors directly to physical pages, NVM interface 218 may store logical-to-physical mappings in pages in the NVM. These pages are referred to herein as index pages, discussed in more detail below.

Figure 3A:
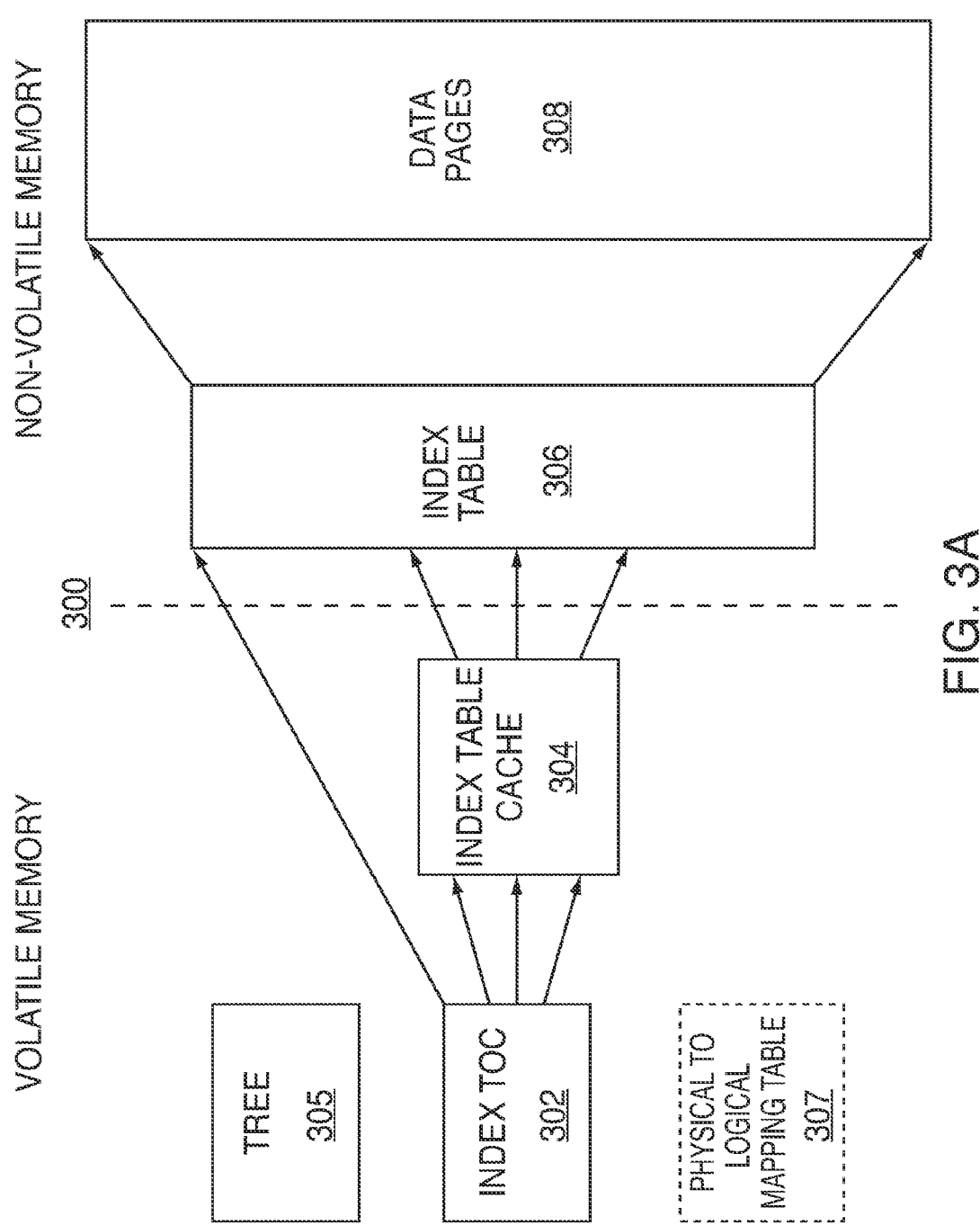
FIGS. 3A, 3B and 4 are illustrative block diagrams of memory mapping architecture, in accordance with various embodiments of the invention.

Referring now to FIG. 3A, a block diagram illustrating an example memory mapping architecture 300 for mapping logical sectors into physical pages using lookup tables is shown. Architecture 300 is divided into volatile memory (shown left of the dashed line) and non-volatile memory (shown right of the dashed line). Lookup table 302 and index cache 304 are stored in volatile memory, whereas index table 306 and data pages 308 are stored in non-volatile memory. Index table 306 maps a logical address to each page of pages 308, thereby storing a logical-to-physical page mapping. Thus, index table 306 holds the physical addresses of data pages 308. Index table 306 is stored in pages of the non-volatile memory.

Lookup table 302 can hold the location (e.g., physical page addresses) of index table 306. Thus, lookup table 302 holds the logical to physical mapping of the index pages that form part of index table 306. Cache 304 can hold the physical addresses of recently written or accessed logical addresses. Thus, cache 304 can hold logical to physical mapping of pages 308 currently being written or recently written. Cache 304 can be a redundant mapping that is also stored in index table 306.

Lookup table 302, cache 304, both table 302 and cache 304, or other data structure in volatile memory can include tree 305. Tree 305 can hold a compressed form of the physical addresses of the most recently accessed or written pages, including pages in index table 306 and data pages 308. In accordance with embodiments of this invention, tree 305 may provide logical addresses for pages experiencing uncorrectable errors. When a page is experiencing an uncorrectable error, and its logical address can be determined by accessing the tree.

Tree 305 uses a tree structure (e.g., a b-tree, a b*-tree, etc.) to decrease the retrieval time for entries within, for example, cache 304. By using a data structure that enables efficient searching (e.g., binary search, etc.) of entries contained in volatile memory (e.g., cache 304), increased speed can be gained when determining whether a desired logical to physical address mapping is contained within the volatile memory. The more quickly a determination as to whether a logical to physical address mapping is contained within the volatile memory, the sooner a flash memory device employing the architecture 300 can use the mapping to initiate retrieval of the identified physical memory. This is advantageous since a flash memory device may consult the volatile memory (e.g., cache 304) frequently (e.g., during read operations) when attempting to resolve a logical to physical address mapping.

Tree 305 can also use data compression to increase its capacity to store logical to physical address mappings. This is advantageous because tree 305 may be allotted a relatively small quantity of volatile memory. Thus by using data compression, older physical addresses can be stored longer before they need to be flushed to make room for newer physical addresses.

Figure 3B:
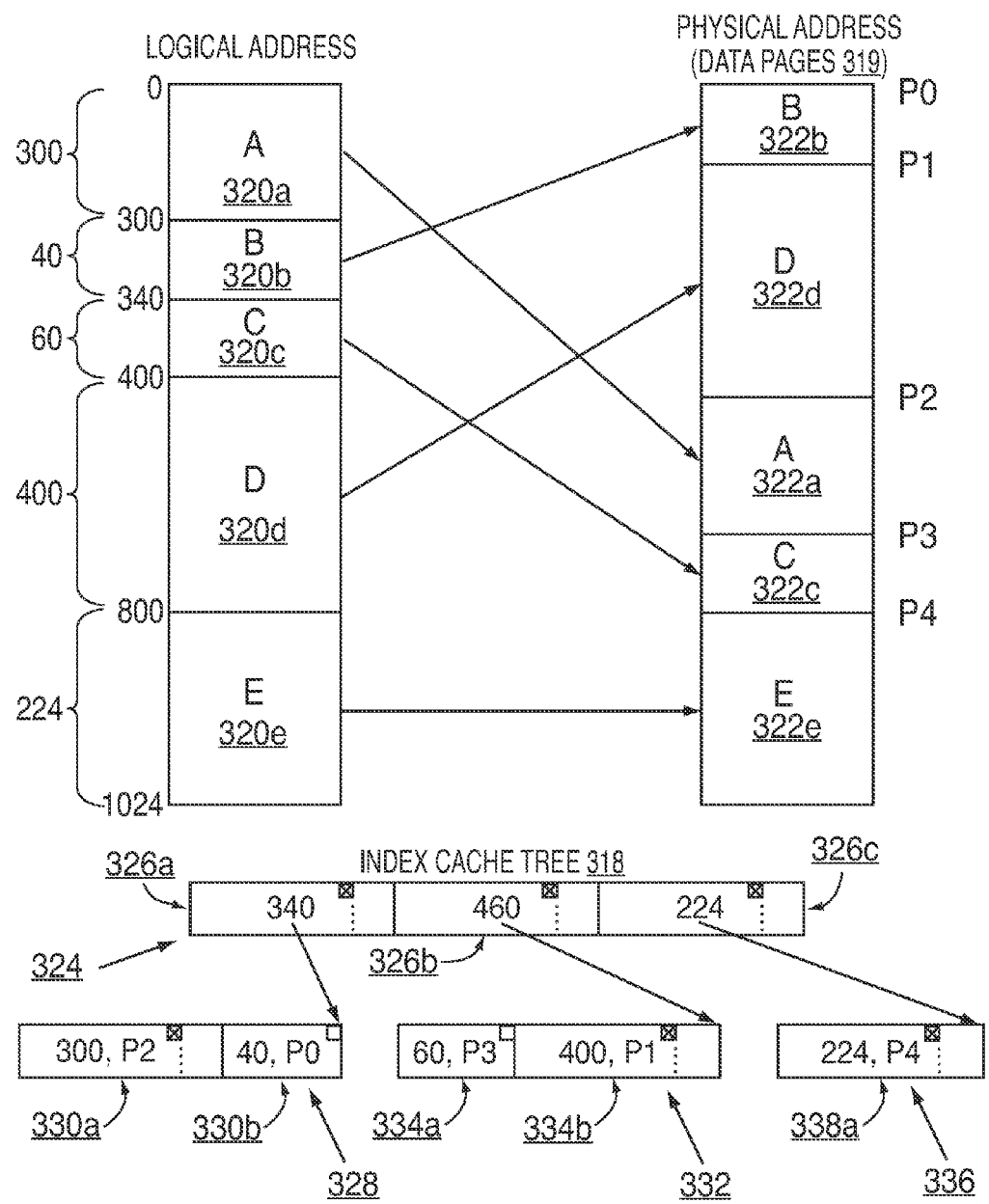

FIG. 3B is a block diagram illustrating an example mapping of logical sectors directly into physical data pages 319 using an example tree 318. Tree 318 is similar to tree 305 and the data pages 319 are similar to data pages 308, as described above with regard to FIG. 3A. In this example, tree 318 has a tree structure that uses two levels of data compression. The first level of data compression corresponds to run-length encoding and the second level of data compression corresponds to a flag designating a size for each entry in the tree. The entry size can correspond to a number of bits allocated to the run-length encoding span. As a run-length encoding span increases in size, a number of bits allocated to the run-length encoding span can increase. For example, a span of 100 logical addresses can be allocated a smaller number of run-length encoding bits than a span of 100,000 logical addresses. A flag can indicate which of a fixed number of predetermined sizes correspond to each entry. For example, if a device generally stores small files (e.g., text files, configuration files, etc.) and large files (e.g., audio files, video files, etc.), the flag can indicate which of two fixed sizes (e.g., 4-bits and 6-bits) are used for run-length encoding each entry. Any number of predetermined entry sizes (e.g., two sizes, four sizes, eight sizes, ten sizes, etc.) can be used within the tree and indicated by the flag. In some implementations, variable-sized entries for storing a physical address and/or pointer fields can be used.

In this example, the data files A-E 320*a-e* are illustrated as corresponding to logical addresses. For example, data file B 320*b* is depicted as corresponding to address 300. The size of each of the data files, A-E 320*a-e*, is shown by the numbered spans to the left of the data files A-E 320*a-e*. For instance, the data file D 320*d* has a logical address span of 400.

The data files A-E 320*a-e* correspond to physical locations in the data pages 319, as depicted by physical data files A-E 322*a-e*. Each of these physical data files A-E 322*a-e* has a corresponding physical address P0-P4. For example, the physical data file A 322*a* has the physical address P2.

Tree 318 maps the logical addresses to the physical addresses using tree of nodes 324, 328, 332, and 336. Each of the nodes 324, 328, 332, and 336 contains at least one of the entries 326*a-c*, 330*a-b*, 334*a-b*, and 338*a*. The entries are populated with logical address spans for each of the data files A-E 320*a-e* and either a pointer to another node or a physical address for a corresponding physical data file A-E 322*a-e*. For instance, the entry 330*a* corresponding to data file A 320*a* contains the logical address span 300 and the physical address P2 of the physical data file A 322*a*.

Nodes 324, 328, 332, and 336 and the entries 326*a-c*, 330*a-b*, 334*a-b*, and 338*a* are organized according to a logical address offset for each entry. A logical address offset can be the difference between the logical address of an entry and the first logical address. In the present example, the logical address offset is the same as the logical address itself because the first logical address is zero. However, were the first logical address to be 100 (e.g., logical address for file A 320*a* is 100), then the logical offset would be the logical address minus 100 (e.g., for file B 320*b* the logical offset would be 200 (300−100=200)).

In the present example, the nodes 324, 328, 332, and 336 and the entries 326*a-c*, 330*a-b*, 334*a-b*, and 338*a* are arranged left-to-right from the smallest logical address offset to the greatest logical address offset. For instance, since the entry 330*a* corresponds to data file A 320*a* (having logical address 0) and the entry 330b corresponds to the data file B 320b (having logical address 300), the entry 330a is arranged to the left of the entry 330b.

Entries that contain a pointer to another node (e.g., entries 326a-c) can store an aggregate logical address span for the entries contained within the pointed to node (and the pointed to nodes children). For instance, the entry 326a has a logical address span of 340, which is the aggregate value of the logical address spans for 330a-b (300+40=340).

The logical address offset for a data file (e.g., data files A-E 320a-e) can be used to locate the physical address for the data file. To identify the entry in the index cache tree 318 that contains the corresponding physical address, the logical address spans stored in the entries 326a-c, 330a-b, 334a-b, and 338a are aggregated as the nodes 324, 328, 332, and 336 are traversed. As the entries of index cache tree 318 are individually examined, the aggregated value (e.g., a tally) serves as the logical address offset for the entry that is currently being evaluated. The tally is initialized at zero and traversal of tree 318 can begin with the first entry 326a (e.g., the entry with the smallest logical address offset) of the root node 324. If the logical address offset at issue (e.g., logical address for which a physical address is sought) is greater than or equal to the tally plus the logical address span of the entry being evaluated, then the logical address span of the entry is added to the tally and the next entry in the node is evaluated.

If the logical address offset is less than the tally plus the logical address span of the entry being evaluated, then the entry being evaluated corresponds to the logical address offset at issue. In such a case, if the entry being evaluated stores a pointer to another node, then evaluation shifts to the first entry of the pointed to node. If the entry being evaluated stores a physical address, then evaluation can end because the corresponding physical address has been located.

For instance, if the physical address for the data file D 320d is sought, the following steps would be taken:

Step 1: Receive logical address offset for data file D 320d (logical address offset=400) and initialize tally=0

Step 2: Is logical address span of entry 326a (340)+tally (0)<=logical address offset (400)? Yes, add logical address span of entry 126a to tally (340=0+340)

Step 3: Is logical address span of entry 326b (460)+tally (340)<=logical address offset (400)? No, follow pointer of entry 326b to node 332

Step 4: Is logical address span of entry 334a (60)+tally (340)<=logical address offset (400)? Yes, add logical address span of entry 334a to tally (400=340+60)

Step 5: Is logical address span of entry 334b (400)+tally (400)<=logical address offset (400)? No, retrieve physical address (P1) stored in entry 334b—corresponding physical address located By storing the logical address span instead of the logical address itself, each entry in tree 318 is compressed. The logical address span will generally be a fraction of the size of the logical address, allowing fewer bits to be allocated. As such, tree 318 can store a greater number of entries than a flat logical-to-physical mapping, which can in-turn improve the speed by which memory accesses are processed and create greater efficiency within a flash memory device.

Additional details regarding tree 318 and other examples thereof and methods of using such trees can be found in co-pending, commonly assigned U.S. patent application Ser. No. 12/509,287, filed Jul. 24, 2009, the disclosure of which is incorporated herein in its entirety.

In some implementations, each entry of the index TOC 302 stores a physical address in non-volatile memory of an index table 306 entry and a pointer to an entry in cache 304. The address 0xff or other suitable indicator can be placed in a index TOC 302 entry to indicate that a desired index table 106 entry is not stored in the cache 304.

In some implementations, index table 306 can include a flat file structure that provides the logical address to physical address mappings. In other implementations, index table 306 can include an index tree that provides compression of data entries, similar to the index cache trees 310 or 318.

In some embodiments, the volatile memory may store a physical-to-logical mapping in optional separate table 307. The physical-to-logical mapping may be the reverse of the logical-to-physical mapping. If desired, in some embodiments, the physical-to-logical mapping may be maintained in non-volatile memory. In one embodiment, table 307 may contain a flat physical-to-logical mapping. In another embodiment, table 307 may contain a compressed tree of the physical-to-logical mapping, similar to tree 305.

Figure 4:
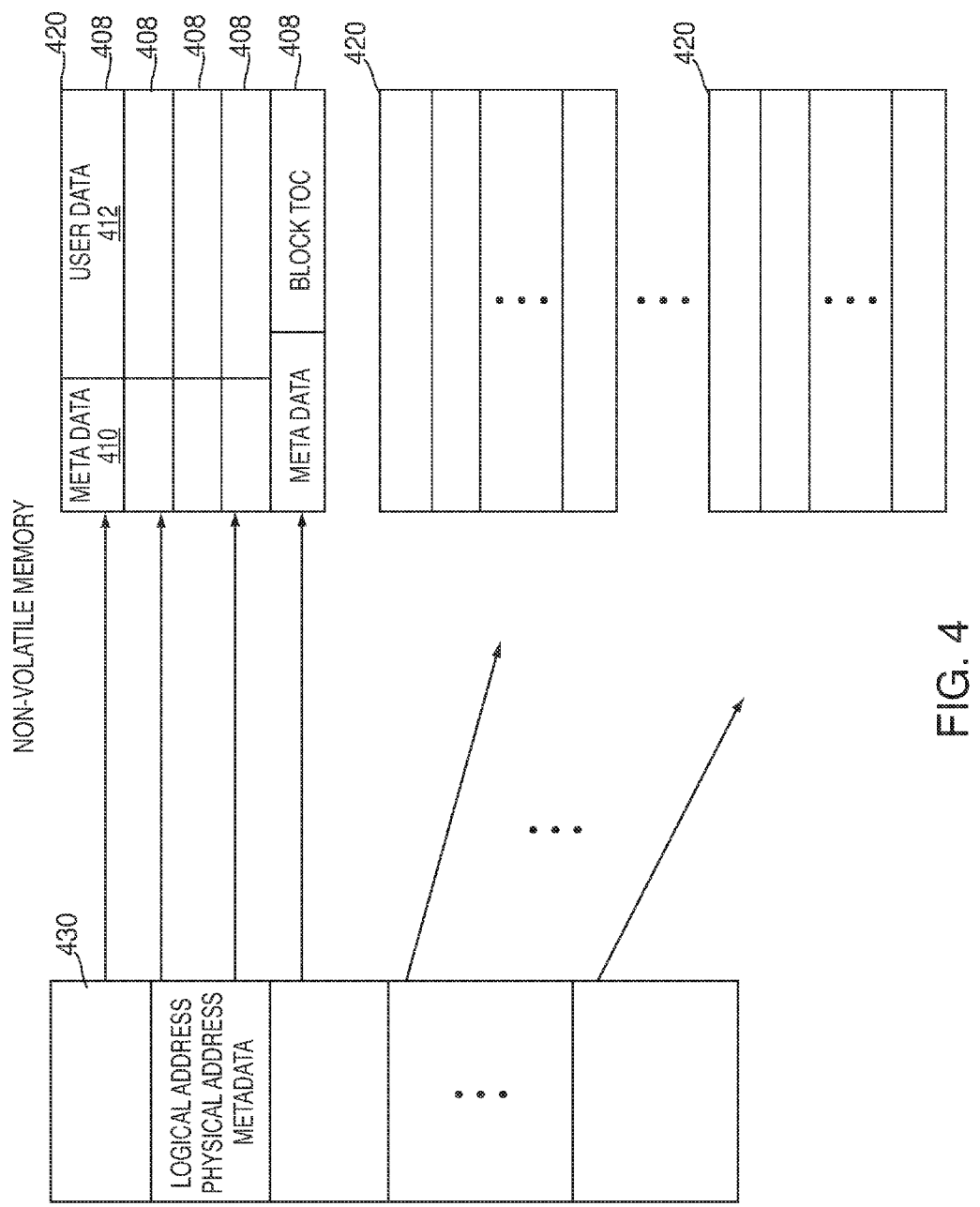

FIG. 4 shows illustrative memory architecture of non-volatile memory. Pages 408 are illustratively arranged in blocks 420. Some pages 408 may be used as data pages and can include metadata 410 and user data 412. Metadata 410 can include the logical address for that page. Some pages may be used for storing information on other pages for a block. For example, one page 408 can include a block table of contents that stores the logical address of each page in the block. The Block TOC may be stored, for example, in the last page within a block, and can also include metadata. This Block TOC typically exists in blocks that have been completely written. In some embodiments, an aggregation of blocks (across two or more dies or planes) may be virtually coalesced to form a superblock. The superblock may have its own Block TOC for storing logical addresses and other metadata for each page of that superblock.

It is understood that references to a Block TOC herein may be made with respect to a block (in the physical sense) or to a superblock (in the virtual sense).

Index table 430 may include several blocks (referred to as index blocks), which include several pages (referred to as index pages). Index table 430 may have an entry for each page 408. The entry may store the logical address, the physical address, and metadata associated with each page 408. Each index page may store logical-to-physical mappings for several pages 408. If an index page experiences an uncorrectable error during a garbage collection operation, the logical-to-physical mappings contained in the index page may not be available to be rewritten to a new index page. Techniques for handling an uncorrectable error for an index page during a garbage collection operation are discussed below.

Garbage collection is an operation that moves valid pages from a first block to a second block so that the first block can be erased and made available for subsequent data storage. Embodiments of this invention involve garbage collection of index blocks. As index pages are moved from the first block to the second block, the logical-to-physical mappings stored in the index pages of the first block are copied over to index pages in the second block. This preserves the logical-to-physical mappings for use by the NVM interface.

Figure 5:
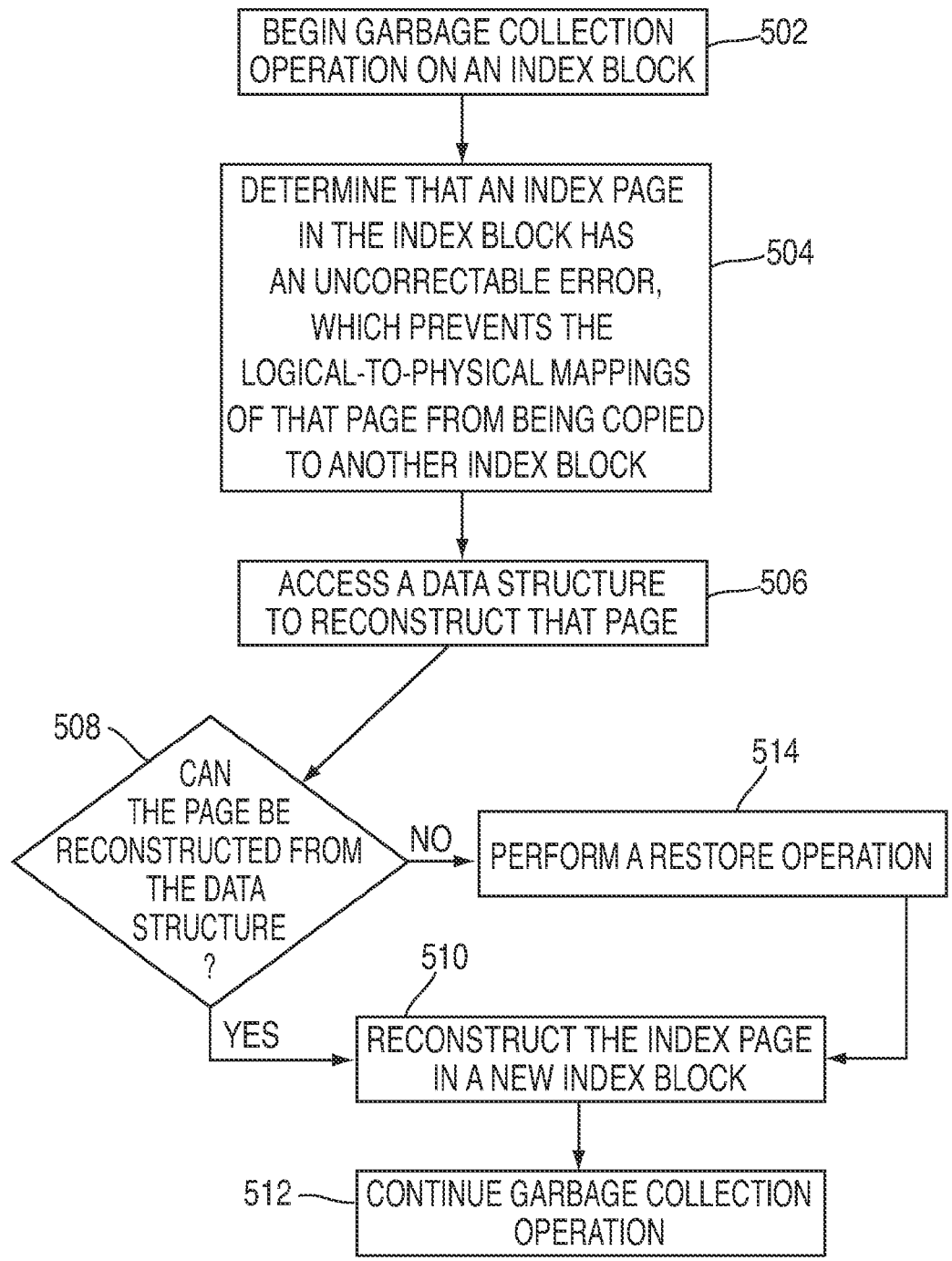
FIG. 5 is a flowchart of an illustrative process for performing garbage collection of an index block in accordance with various embodiments of the invention.

FIG. 5 is an illustrative flow chart of steps that may be taken to handle an uncorrectable error during a garbage collection of an index block according to an embodiment of the invention. Beginning at step 502, a garbage collection operation on an index block may begin. At step 504, it is determined that a page has an uncorrectable error, which prevents the logical-to-physical mappings stored in that page from being copied over to a new index block. The determination that the index page has an uncorrectable error may occur when the NMV interface attempts to read that index page. For the purposes of this example, assume that a determination has been made as to which pages in a given block are valid and that only those valid pages will be read so that they can be reconstructed in another block.

At step 506, a data structure stored in volatile memory is accessed to reconstruct the index page. The data structure may be a tree (such as tree 305 of FIG. 3A) that holds the physical addresses of the most recently accessed or written logical sectors in a compressed format. Accessing a data structure in volatile memory can offer speed advantages over having to access the NVM to reconstruct an index page for at least the reason that looking up data structures in volatile memory can be faster than reading pages in NVM.

A determination is made as to whether the data structure contains the logical-to-physical mappings of the index page at step 508. In one embodiment, the determination may be made by having the NVM interface obtain the index page number (of the index page experiencing the uncorrectable error) by accessing metadata associate with the page. The metadata may be contained in the metadata section of the page, a block table of contents, or another location in volatile memory or NVM that stores redundant metadata. For example, the redundant metadata may be found in a neighboring page. A more detailed explanation of accessing redundant metadata from a neighboring page can be found, for example, in Post et al., U.S. patent application Ser. No. 12/562,860, filed Sep. 18, 2009.

Using the index page number, the logical address of the index page can be obtained. For example, the logical address can be translated from the index page number by taking the index page number times an index page ratio (which is fixed for a given NVM configuration). The translated logical address is used by the NVM interface to access the data structure (e.g., tree) to obtain the logical-to-physical mappings of the index page.

In another embodiment, the determination may be made by performing an exhaustive search of the data structure (e.g., tree). This exhaustive search may be performed in place of the aforementioned embodiment or as a backup thereto if the index page number cannot be retrieved. In this embodiment, if the physical address of the index page is contained in the data structure, the logical-to-physical mappings can be retrieved.

In another embodiment, the determination may be made by performing an exhaustive search of a data structure contained in NVM.

If the index page can be reconstructed from the data structure, the index page is reconstructed in a new index block, as indicated by step 510. The garbage collection operation continues at step 512.

If, at step 508, the index page cannot be reconstructed from the volatile data structure (e.g., tree), a restore operation may be performed at step 514. A number of different restore operations may be performed. In one embodiment, the restore operation may be a full reboot of the system. In another embodiment, the restore operation may involve restoring the single index page without having to do a full-mount of the file system. In other embodiment, the restore operation may involve restoring the index block containing the page with the uncorrectable error. A more detailed explanation of various restore techniques can be found, for example, in commonly assigned U.S. patent application Ser. No. 12/509,071, filed Jul. 24, 2009, the disclosure of which is incorporated herein by reference in its entirety. Regardless of which restore operation is performed, the logical-to-physical mappings for the index page are retrieved and the process can proceed to step 510.

Figure 6:
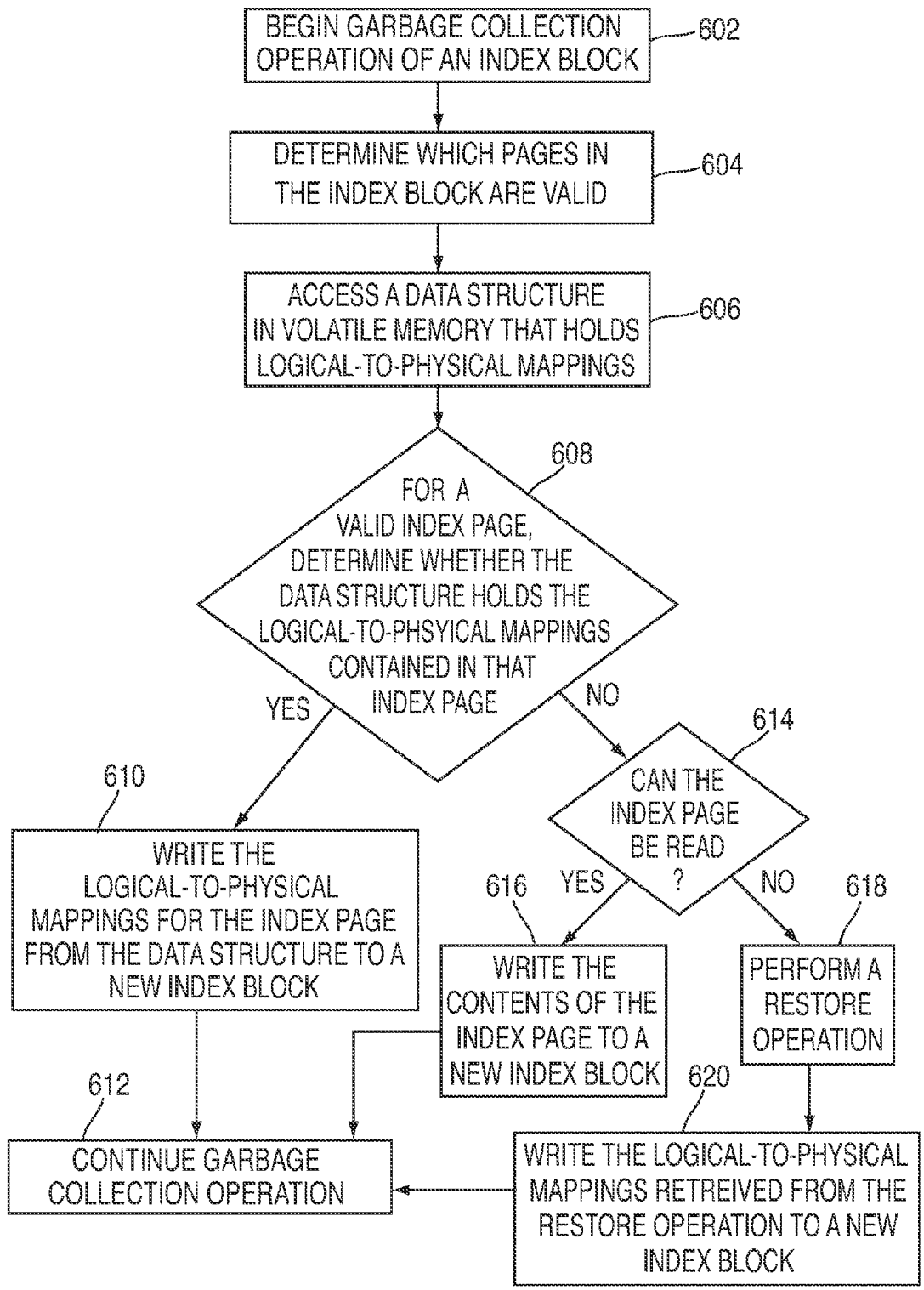
FIG. 6 is a flowchart of another illustrative process for performing garbage collection of an index block in accordance with various embodiments of the invention.

FIG. 6 is an illustrative flow chart of steps that may be taken to handle an uncorrectable error during a garbage collection of an index block according to an embodiment of the invention. Beginning at step 602, a garbage collection operation of an index block begins. At step 604, a determination is made as to which index pages are valid. The valid pages are the pages that need to be copied to a new index block prior to block erasure.

At step 606, a data structure held in volatile memory that stores logical-to-physical mappings is accessed. The data structure may be a tree such as tree 305 of FIG. 3A and may contain a redundant version of the logical-to-physical mappings stored in the valid index pages. For a valid index page, a determination is made whether the mappings contained therein can be retrieved from the data structure (step 608). If so, the mappings for that page are written from the data structure to a new index block (step 610) and the garbage collection operation can continue at step 612. If not, a determination is made whether the index page can be read at step 614.

If the index page can be read, the contents contained therein are written to a new index block, as indicated by step 616 and the process can continue with the garbage collection operation, as indicated by step 612. If the index page cannot be read, a restore operation may be performed at step 618. The restore operation may be any one of the restore operations discussed above in connection with step 514.

When the logical-to-physical mappings are retrieved in the restore operation, the mappings can be written to a new index block (step 620) and the garbage collection operation can continue at step 612.

Figure 7:
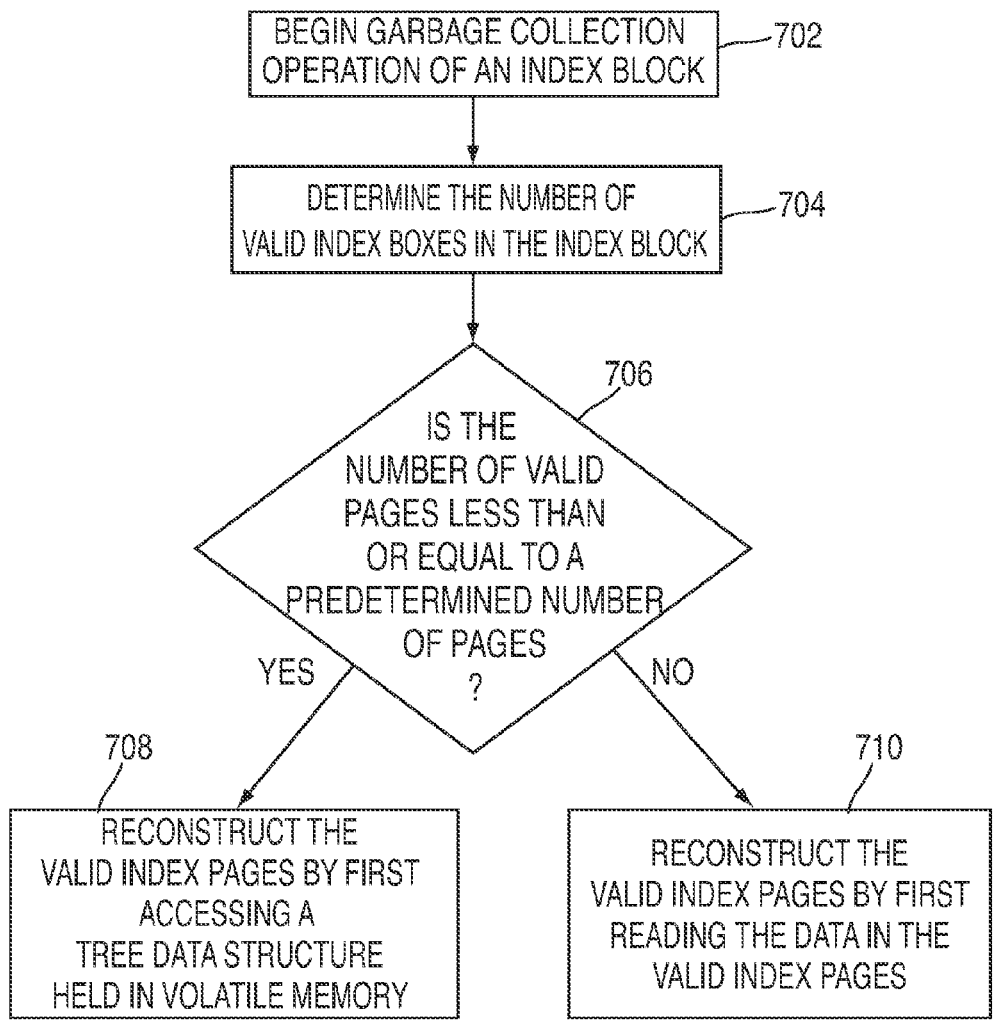
FIG. 7 is a flowchart of an optimization of a garbage collection of an index block in accordance with various embodiments of the invention.

FIG. 7 shows an illustrative flowchart of a garbage collection operation in accordance with an embodiment of the invention. This flowchart illustrates how the NVM interface can optimize performance of the garbage collection operation. Beginning at step 702, the garbage collection of an index block begins. At step 704, a determination is made as to the number of valid index pages in the index block. When the number of valid index pages is determined, the NVM interface decides whether optimal performance will be achieved by first attempting to reconstruct the index pages from a tree (e.g., tree 305) held in volatile memory or by first attempting to reconstruct the index pages by reading the index pages. This determination can be based on whether it will be faster to read the pages or to access the tree to perform the reconstruction of index pages in a new index block. Reading speed is largely dependent on the speed characteristics of the NVM—that is (e.g., bus timing, latches, etc.) or the number of pages that can be read in parallel. Taking the speed characteristics in to account, the decision whether to reconstruct by first accessing the tree or by first reading the index pages can be made based on the number of valid index pages At step 706, a determination is made if the number of valid pages is less than or equal to a predetermined number of pages. If the number of valid pages is less than or equal to a predetermined number of pages, the valid index pages are reconstructed by accessing a tree data structure in volatile memory, at step 708. The process of reconstructing the index pages is similar to the steps discussed above in connection with FIG. 6. If the number of valid pages is greater than the predetermined number of pages, the valid index pages are reconstructed by first reading the index pages (step 710). The process of reconstructing the index pages by reading the valid pages first is similar to steps discussed above in connection with FIG. 5.

The described embodiments of the invention are presented for the purpose of illustration and not of limitation, and the invention is only limited by the claims which follow.

What is claimed is:

1. A processor for facilitating a method for performing garbage collection of an index block of a non-volatile memory, the index block including index pages that store logical-to-physical mappings of data pages, the method comprising:
   determining that an index page has an uncorrectable error during garbage collection of the index block, the uncorrectable error preventing the logical-to-physical mapping contained in the index page from being reconstructed in a new index block;
   accessing a data structure in volatile memory to determine if the data structure contains the logical-to-physical mapping of the index page;
   determining whether the data structure has the logical-to-physical mapping of the index page;
   in response to determining that the data structure does have the logical-to-physical mapping of the index page,
      reconstructing the index page using the logical-to-physical mapping from the data structure in a new index block; and
   in response to determining that the data structure does not have the logical-to-physical mapping of the index page,
      performing a restore operation to obtain the logical-to-physical mapping of the index page; and
      using the logical-to-physical mapping obtained from the restore operation to reconstruct the index page in the new index block.

2. The processor of claim 1, wherein the restore operation is a reboot operation.

3. The processor of claim 1, wherein the restore operation is a page specific restore operation or a block restore operation.

4. The processor of claim 1, wherein the data structure is a tree that stores physical addresses of pages in a compressed form.

5. The processor of claim 1, wherein the determining that an index pale has an uncorrectable error during garbage collection of the index block comprises:
   determining the index page number of the index page;
   translating the index page number into a logical address by taking the product of the index page number and an index page ratio; and
   using the logical address to access at least one node in the data structure, the at least one node potentially containing the logical-to-physical mapping of the index page.

6. The processor of claim 1, wherein the data structure is a tree data structure, and wherein the determining comprises performing an exhaustive search of the tree data structure to locate the logical-to-physical mapping of the index page.

7. A memory interface for accessing a non-volatile memory, the non-volatile memory comprising index blocks, each index block comprising index pages that map logical-to-physical addresses of data pages, the memory interface comprising:
   a bus controller for communicating with the non-volatile memory; and
   control circuitry operative to direct the bus controller to perform a garbage collection operation on an index block, the control circuitry further operative to:
      determine which index pages in the index block are valid index pages;
      for a valid index page, determine whether a data structure held in volatile memory has the logical-to-physical mappings of the valid index page;
      in response to determining that the data structure has the logical-to-physical mappings of the valid index page, reconstruct the valid index page in a new index block using the logical-to-physical mappings from the data structure; and
      in response to determining that the data structure does not have the logical-to-physical mapping of the valid index page, execute one of:
         a reconstruction operation to reconstruct the valid index page in the new index block if the valid index page can be read, and
         a restore operation to obtain the logical-to-physical mapping of the index page if the valid index page cannot be read.

8. The memory interface of claim 7, wherein
   the control circuitry is further operative to use the logical-to-physical mapping obtained from the restore operation to reconstruct the index page in the new index block.

9. The memory interface of claim 7, wherein the data structure includes a tree of a logical-to-physical mapping.

10. The memory interface of claim 7, wherein the restore operation is a reboot operation.

11. The memory interface of claim 7, wherein the restore operation is a page specific restore operation or a block restore operation.

* * * * *

UNITED STATES PATENT AND TRADEMARK OFFICE
CERTIFICATE OF CORRECTION

PATENT NO. : 8,812,816 B2  Page 1 of 1
APPLICATION NO. : 12/729556
DATED : August 19, 2014
INVENTOR(S) : Daniel J. Post et al.

It is certified that error appears in the above-identified patent and that said Letters Patent is hereby corrected as shown below:

In the Claims

In Column 11, Claim 5, Line 42, delete "pale" and insert -- page --, therefor.

Signed and Sealed this
Fourteenth Day of July, 2015

Michelle K. Lee
*Director of the United States Patent and Trademark Office*